United States Patent [19]

Jacobson

[11] 4,385,205

[45] May 24, 1983

[54] SINGLE MOTOR DRIVE ASSEMBLY FOR A TAPE CASSETTE TELEPHONE ANSWERING DEVICE

[76] Inventor: Sava Jacobson, 8130 Orion St., Van Nuys, Calif. 91406

[21] Appl. No.: 260,360

[22] Filed: May 4, 1981

[51] Int. Cl.³ .................... H04M 1/64; G11B 15/00
[52] U.S. Cl. ................................. 179/6.03; 360/96.4
[58] Field of Search ................... 179/6.09, 6.03; 360/96.3, 90–93, 74.2, 74.1, 96.4; 192/41 R, 41 S, 45, 45.1, 12 BA; 188/7, 7.74, 7.77; 318/294, 293; 242/201, 200

[56] References Cited

U.S. PATENT DOCUMENTS

| | | | |
|---|---|---|---|
| 3,349,880 | 10/1967 | Baer | 192/12 BA X |
| 3,425,526 | 2/1969 | Baer | 192/12 BA |
| 3,496,441 | 2/1970 | Heider et al. | 318/294 X |
| 3,659,806 | 5/1972 | Crafts | 360/96.4 |
| 3,797,618 | 3/1974 | Peterson et al. | 192/12 BA |
| 3,968,329 | 7/1976 | Darwood | 179/6.03 |
| 4,049,169 | 9/1977 | Houf, Jr. | 192/12 BA X |
| 4,114,834 | 9/1978 | Haake | 242/201 X |
| 4,275,340 | 6/1981 | Schleupen | 318/294 X |
| 4,319,171 | 3/1982 | Motoori | 318/293 X |
| 4,341,981 | 7/1982 | Osamai | 318/294 X |
| 4,342,055 | 7/1982 | Osanai | 242/201 X |

FOREIGN PATENT DOCUMENTS 2345021 10/1977 France ........................ 179/6.03

Primary Examiner—Aristotelis M. Psitos
Attorney, Agent, or Firm—Spensley, Horn, Jubas & Lubitz

[57] ABSTRACT

In this drive assembly for a tape cassette telephone answering device, a single motor alternately drives only the outgoing announcement tape loop cassette or only the incoming message tape cassette, depending solely on the direction of rotation of the motor. This is accomplished by using one-way clutches to couple each flywheel to its associated tape drive capstan, and by utilizing a drive belt which engages the drive motor and extends in a figure eight configuration around the two flywheels.

During the initial portion of the answering cycle the motor is rotated in one direction in which rotation of one flywheel is coupled by its clutch to the capstan associated with the outgoing announcement tape loop. Rotation of the other flywheel is not imparted to the capstan which drives the incoming message record tape cassette. At the mid-cycle shift, after completion of transmission of the outgoing announcement, the direction of rotation of the motor is reversed. This reverses the direction of both flywheels, thereby causing the capstan associated with the incoming message record tape to be driven and the other capstan to be stopped. A ratchet mechanism is provided in conjunction with the spindle drive transfer mechanism. This ensures that the takeup spindle of the incoming message tape cassette is not driven while the outgoing announcement tape capstan is being driven.

9 Claims, 11 Drawing Figures

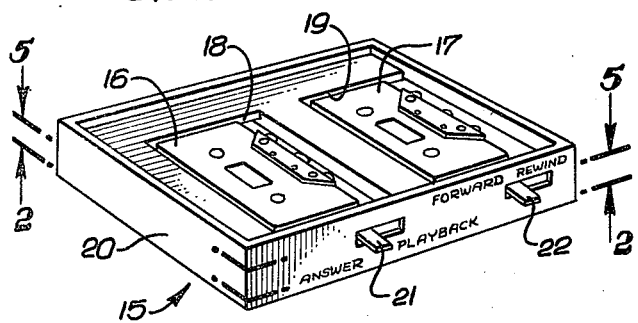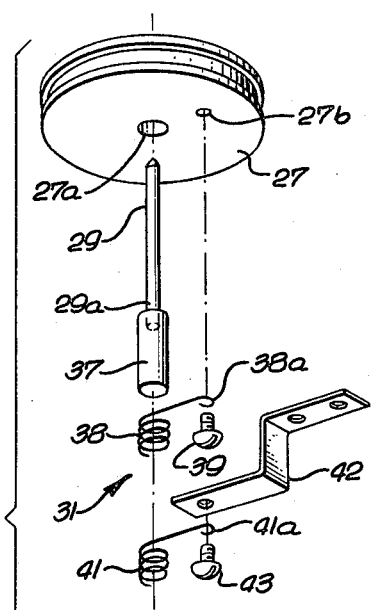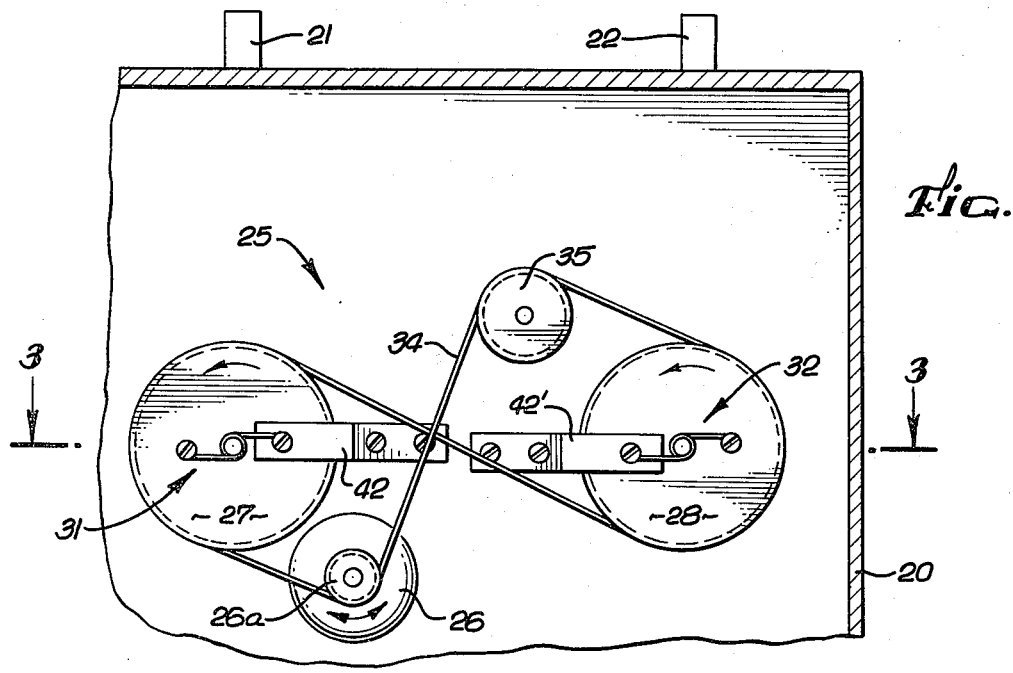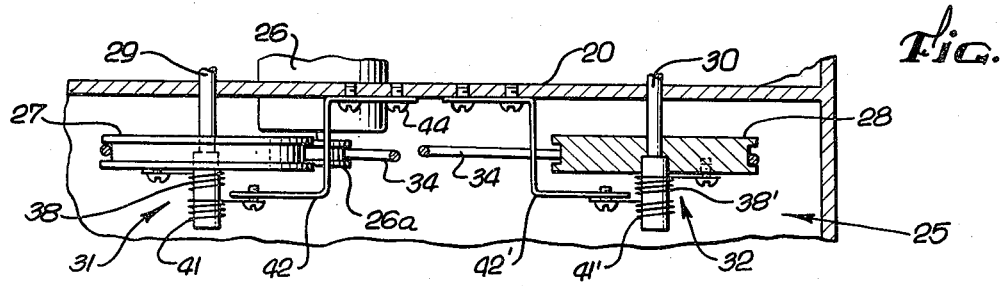

←ANSWER  PLAYBACK→  ←FORWARD  REWIND→

SINGLE MOTOR DRIVE ASSEMBLY FOR A TAPE CASSETTE TELEPHONE ANSWERING DEVICE

BACKGROUND OF THE INVENTION

1. Field of the Invention

The present invention relates to a cassette drive assembly for a telephone answering device in which a single motor alternately drives only the outgoing announcement tape cassette or only the incoming message tape cassette, depending solely upon the direction of rotation of the motor.

The invention is covered by Disclosure Document No. 099,479 filed Apr. 13, 1981.

2. Description of the Prior Art

The use of magnetic tape cassettes is particularly desirable in a telephone answering device. Space is minimized, there is no problem of accidental tape spillage, and the cassettes are easy to handle and replace. Recorded incoming messages can be retained by simply substituting a new cassette for recording future messages.

The inventor's U.S. Pat. No. 4,118,602 shows a simplified mechanical control arrangement for a telephone answering device employing a reel-to-reel incoming message recording tape and a separate outgoing announcemnt loop. The mechanism employs two control arms connected by a lost motion linkage. Once control arm selects forward or rewind operation of the incoming message tape, and the other facilitates answer or playback mode selection.

In the inventor's copending U.S. patent application Ser. No. 211,241 filed Nov. 28, 1980, there is shown a related mechanical control arrangement for a telephone answering device in which magnetic tape cassettes are used for both the outgoing announcement and for recording incoming messages. This embodiment likewise employs two control arms, one for forward-rewind selection and the other for answer-playback mode control, but is configured to meet certain drive requirements unique to tape cassettes. For example, it includes a drive transfer assembly for separately driving the takeup spindle or the supply spindle of the incoming message tape cassette respectively during forward or rewind operation.

In both of the foregoing systems, a single motor continuously drives both the outgoing announcement tape loop and the incoming message record tape during the entire answering cycle. As a result, each time that a call is answered, either the entire outgoing announcement is recorded on the incoming message tape, or, even if recording is inhibited, the message tape advances a corresponding distance. This reduces the amount of space available for recording incoming messages, thereby reducing the number of calls that can be answered automatically before the tape supply is exhausted. An additional disadvantage is that when the recorded incoming messages are played back, the listening time is increased since between each recorded call the incoming message tape contains either a reproduction of the outgoing announcement or a blank space.

These problems could be eliminated by using separate motors alternately to drive the outgoing and incoming message tapes. Another approach is the use of an electromechanical clutch or drive transfer assembly to couple a single motor only to the outgoing announcement tape loop during the initial portion of the answering cycle and only to the incoming message tape during the remainder portion of the answering cycle. Such approaches are relatively costly, since they require either a second motor or additional electromechanical components. Moreover, such approaches do not readily lend themselves to incorporation with the simplified mechanical control arrangements presented in the above-mentioned U.S. Pat. No. 4,118,602 and application Ser. No. 211,241.

Thus it is an objective of the present invention to provide a simplified, single motor drive system for a telephone answering device in which only one or the other, but not both, of the outgoing announcement and incoming message recording tapes are driven at one time. Another objective is to provide such a system in which only the direction of rotation of the single motor determines which of the two tapes is driven. A further objective is to provide such a system for use with a telephone answering device utilizing magnetic tape cassettes and a simplified, two control arm, mechanical control arrangement.

SUMMARY OF THE INVENTION

These and other objectives are achieved in a tape cassette telephone answering device wherein a single motor alternatively drives only the outgoing announcement tape loop cassette or only the incoming message tape cassette, depending solely on the direction of rotation of the motor. A single motor drives a belt which extends in a figure eight configuration around the respective flywheels associated with the drive capstans for the two tape cassettes. The flywheels are not fixed to the respective capstan shafts. Rather, they are coupled by respective one-way clutch assemblies. When the drive motor is rotated in a first direction, the flywheel associated with the capstan of the outgoing announcement tape cassette is coupled via the clutch to the captstan shaft, so that the outgoing announcement tape is driven. At the same time, the other one-way clutch assembly prevents rotation of the capstan associated with the incoming message record tape.

When the drive motor is rotated in the opposite direction, the two one-way clutch assemblies perform the opposite function. That is, the flywheel associated with the incoming message tape cassette is coupled to its capstan so as to drive the incoming message record tape. The capstan for the outgoing announcement cassette is clamped to prevent rotation.

When a call is answered, the drive motor first is energized to rotate in a first direction which actuates only the outgoing announcement tape loop cassette. The incoming message tape is held stationary. At the midcycle shift, when transmission of the outgoing announcement is completed, the direction of rotation of the single drive motor is reversed. Now the outgoing announcement tape cassette is stopped and the incoming message tape cassette is driven so as to record the incoming message. Tape usage is maximized. The separate but selective drive is accomplished with a single motor, and with no electromechanical drive transfer assemblies.

To provide spindle drive for the incoming message tape cassette, the motor driven belt engages a spindle drive transfer assembly associated with that cassette. A ratchet mechanism prevents rotation of the takeup spindle while the motor is driving the outgoing announcement tape cassette. The mechanism includes a ratchet wheel, coupled to the takeup spindle, rotation of which is prevented by a flexible pawl mounted on the forward-rewind control arm. The drive transfer assembly transmits power to the takeup spindle via a friction disc that is in contact with the ratchet wheel.

During announcement transmission the friction disc rotates in the direction in which motion of the ratchet wheel is prevented by the pawl. Thus the takeup spindle is stopped. During receipt of incoming messages, however, the friction disc rotates in the opposite direction, thereby imparting rotation to the takeup spindle via the ratchet wheel. Rotation of the ratchet wheel in this direction is permitted as the flexible pawl slides over the ratchet teeth. During rewind the pawl is withdrawn by the control arm to allow free rotation of the takeup spindle.

BRIEF DESCRIPTION OF THE DRAWINGS

A detailed description of the invention will be made with reference to the accompanying drawings wherein like numerals designate corresponding elements in the several figures.

FIG. 1 is a pictorial view of a telephone answering device utilizing magnetic tape cassettes and incorporating the inventive single motor drive assembly.

FIG. 2 is a fragmentary bottom view of the device of FIG. 1, as viewed along the line 2—2 thereof, and showing the motor, belt and flywheel components of the inventive drive assembly.

FIG. 3 is a transverse sectional view, as seen along the line 3—3 of FIG. 2, showing the one-way clutches that couple the flywheels to the capstan shafts for each of the tape cassettes.

FIG. 4 is an exploded pictorial view of one of the flywheel and one-way clutch assemblies of FIG. 3.

DESCRIPTION OF THE PREFERRED EMBODIMENTS

The following detailed description is of the best presently contemplated modes of carrying out the invention. This description is not to be taken in a limiting sense, but is made merely for the purpose of illustrating the general principles of the invention since the scope of the invention best is defined by the appended claims. Operational characteristics attributed to forms of the invention first described also shall be attributed to forms later described, unless such characteristics obviously are inapplicable or unless specific exception is made.

Shown in FIG. 1 is a telephone answering device 15 which incorporates the inventive single motor drive assembly. The device 15 advantageously employs a reentrant loop magnetic tape cassette 16 that contains the outgoing announcement, and a magnetic tape 17 onto which incoming message are recorded. The manner in which the device 15 automatically answers a telephone call may be like that disclosed in the the inventor's U.S. Pat. No. 3,780,226 entitled "Telephone Answering Apparatus", together with appropriate provision to reverse the direction of rotation of the single drive motor at the end of outgoing announcement transmission.

Figure 5:
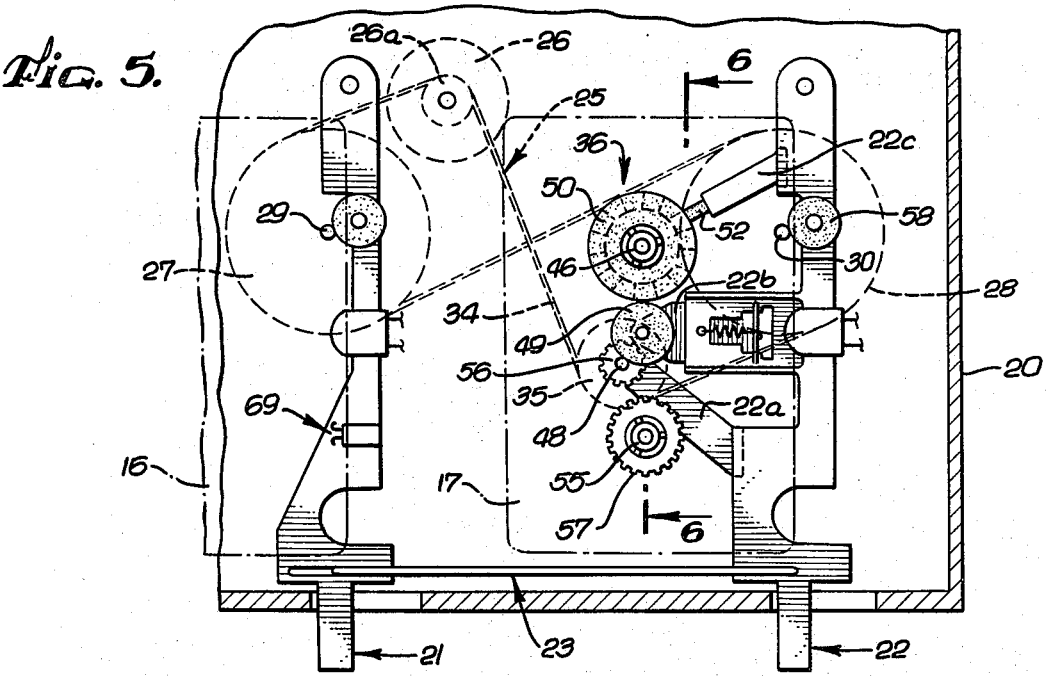
FIG. 5 is a fragmentary top view of the device of FIG. 1, seen along the line 5—5 thereof, showing the control arms, the spindle drive transfer assembly and the ratchet mechanism associated with the takeup spindle of the incoming message tape cassette.
Figure 8:
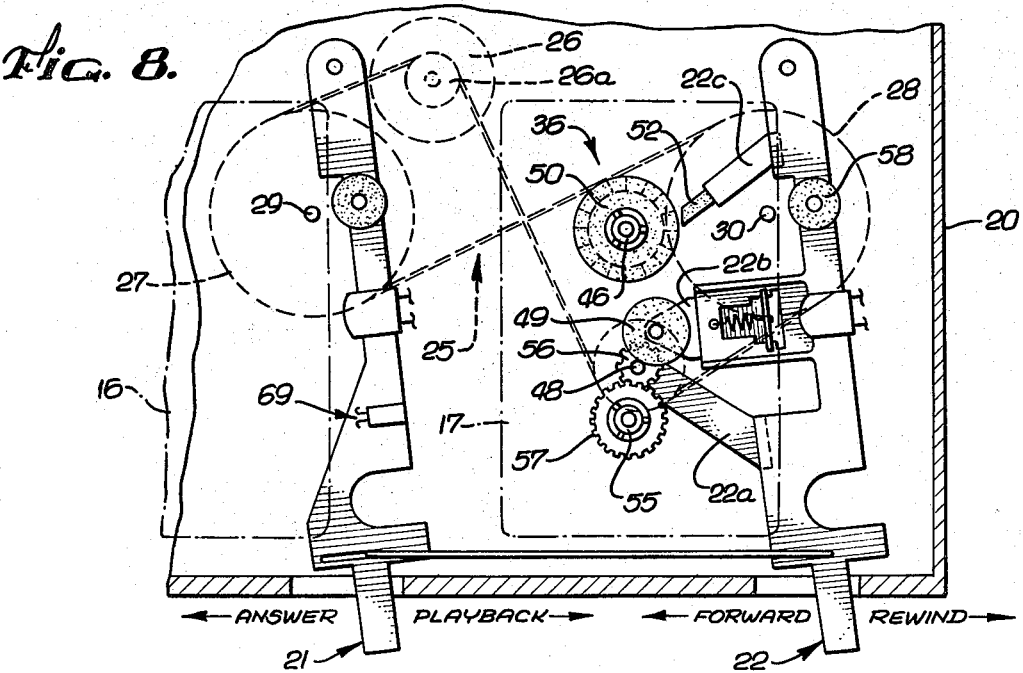
FIG. 8 is a fragmentary top view like that of FIG. 5, but with the control arms respectively in the "rewind" positions.

The tape cassettes 16 and 17 are received in respective recesses 18, 19 of a chassis or housing 20. Selection of the operational mode of the device is accomplished by means of an "answer-playback" control arm 21 and a "forward-reverse" control arm 22. These are connected by a lost motion linkage 23 (FIGS. 5 and 8). With this arrangement, when the control arm 21 is moved to automatic answer position, the control arm 22 is always urged to the forward position. Conversely, when the arm 22 is moved to the rewind position, the control arm 21 is moved to the playback position. Details of this control mechanism, which per se forms no portion of the present invention, are set forth in the inventor's above-identified copending U.S. patent application Ser. No. 211,241.

The outgoing announcement tape cassette 16 and the incoming message tape cassette 17 are alternatively driven by the inventive single motor drive assembly 25 (FIGS. 2, 3, 5 and 8). When the single motor 26 is rotated clockwise as viewed from below (see the arrows in FIG. 2), only the outgoing announcement tape cassette 16 will be driven. The incoming message record tape 17 will be stopped. Conversely, when the motor 26 is driven counterclockwise (as viewed from below), the announcement cassette 16 will be stopped and the incoming message recording tape 17 will be driven.

To accomplish this, separate flywheels 27, 28 are associated with the respective tape drive capstans 29, 30 for the cassettes 16 and 17. Each flywheel is not affixed to the associated capstan shaft, but rather is free to rotate with respect to that shaft. An associated one-way or slip clutch assembly 31, 32 selectively couples one of the flywheels 27, 28 to its associated capstan 29, 30 while at the same time the other capstan is clamped so as to prevent the rotation thereof. When the motor 26 is rotated clockwise (FIG. 2), the flywheel 27 is coupled to the shaft of the capstan 29 while the capstan 30 is stopped. When the motor 26 is rotated counterclockwise, the flywheel engages the capstan 30 and the capstan 29 is stopped.

Figure 6:
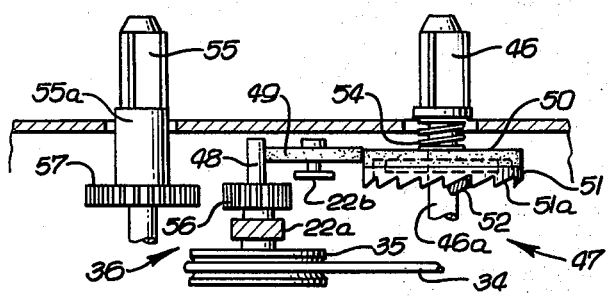
FIG. 6 is a fragmentary transverse sectional view, as seen along the line 6—6 of FIG. 5, showing details of the spindle drive transfer assembly.

A belt 34 engages a pulley 26a on the motor 26 and extends in a figure eight configuration around the flywheels 27 and 28, and around a wheel 35 associated with a spindle drive transfer assembly 36 (FIGS. 5, 6 and 8). With this arrangement, the flywheels 27 and 28 always rotate in opposite directions. The belt 34 advantageously is of a resilient material so as to accommodate the half-twist necessary for the illustrated figure eight configuration.

Details of the one-way clutch assembly 31 are shown in FIGS. 3 and 4. Attached to the bottom of the capstan shaft 29a is a cylindrical shaft extension member 37 advantageously formed of nylon or like low-friction material. The flywheel 27 has a central opening 27a which is counterbored to receive the upper end of the member 37 as shown in FIG. 3. The opening 27a is dimensioned to permit the flywheel to rotate freely with respect to the shaft 29a and member 37.

Surrounding a portion of the cylindrical member 37 is a first coil spring 38 one end 38a of which is affixed to the flywheel 27 by means of a screw 39 received in a tapped hole 27b. The spring 37 is coiled in an appropriate direction so that as the flywheel 27 rotates clockwise (as seen in FIG. 2), the spring 38 will tighten about the member 37. As a result of this gripping action, rotation of the flywheel 27 will be imparted to the capstan 29 via the spring 38, the member 37 and the shaft 29a.

When the flywheel is rotated in the opposite direction (i.e, counterclockwise as viewed in FIG. 2), the spring 38 will not tighten around the member 37, but will loosen up and will slip easily over the smooth surface of the nylon member 37. Thus counterrotation of the flywheel 37 will not be imparted to the capstan 29. Some slight counterrotation might be imparted to the capstan 29 by friction between the interior of the flywheel opening 27a and the shaft 29a or member 37. In the assembly 31 such capstan counterrotation is prevented by use of a second spring 41 which is wound around the member 37 in the same direction as the spring 38. This spring 41, however, is fixed to the chassis 20 via a Z-bracket 42. The end 41a of the spring 41 is attached to the bracket by a screw 43, and the bracket 42 itself is mounted to the chassis 20 by screws 44 (FIG. 3).

As the flywheel counterrotates (i.e., rotates counterclockwise as seen in FIG. 2), a like counterclockwise rotation may be imparted to the spindle 29 and member 37 by frictional engagement via the opening 27a. Such counterrotation of the member 37 now will cause the spring 41 to tighten up, thereby firmly clamping the member 37 to the bracket 42 and chassis 20. This clamping action will affirmatively stop rotation of the spindle 29. Thus the one-way clutch assembly 31 effectively couples rotation of the flywheel 27 in one direction to the capstan 29, while preventing rotation of the capstan 29 when the flywheel is rotated in the opposite direction.

The one-way clutch assembly 32 associated with the flywheel 28 is of like construction to that shown in FIG. 4. Its springs 38' and 41' are wound in the same direction as the corresponding springs 38 and 41 of the assembly 31. Thus when the flywheel 28 is rotated clockwise (as viewed in FIG. 2), the rotation is coupled to the tape drive capstan 30 associated with the incoming message tape cassette 17. When the flywheel 28 in the counterclockwise direction, the capstan 30 is prevented from rotation by the clamping action of the spring 41'. That spring 41' is attached to the chassis 20 via a bracket 42'.

It will now be appreciated that when the single drive motor 26 is rotated in the clockwise direction (as viewed in FIG. 2), the flywheel 27 rotates clockwise and hence drives the outgoing announcement tape capstan 29. At the same time, the flywheel 28 rotates counterclockwise so that rotation of the incoming message tape capstan 30 is prevented by the clamping action of the spring 41'. Conversely, when the motor 26 is rotated counterclockwise the flywheel 28 will rotate clockwise and the one-way clutch assembly 32 will impart this rotation to the capstan 30. This will cause the incoming message tape cassette 17 to be driven. At the same time, the flywheel 27 will rotate counterclockwise. The clutch 31 will clamp the capstan 29 so as to prevent motion of the outgoing announcement tape loop. In this manner, the assembly 25 accomplishes the requisite drive of only one or the other, but not both, of the tape cassettes 16 and 17 depending only on the direction of rotation of the single motor 26.

The spindle drive transfer assembly is shown in FIGS. 5, 6 and 8. With the control arm 22 in the forward position shown in FIG. 5, driving motion can be imparted from the belt 34 to the takeup spindle 46 for the cassette 17 via the assembly 36. Such takeup spindle drive is necessary during recording of the incoming messages, when the motor 26 is rotating in the direction appropriate to drive the tape capstan 30. At that time, the pulley 35 will be rotating clockwise as viewed in FIG. 2. However, when the outgoing announcement tape cassette 16 is being driven, it is necessary to prevent rotation of the incoming tape message spindle 46. This is accomplished by a ratchet mechanism 47 (FIGS. 5-8) which operates in conjunction with the spindle drive transfer assembly 36.

Figure 7:
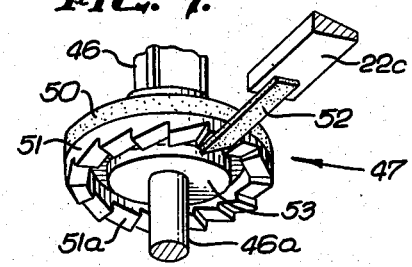
FIG. 7 is a fragmentary perspective view showing details of the ratchet mechanism of FIGS. 5 and 6.

As shown in FIGS. 5, 6 and 7, the pulley 35 is affixed to a shaft 48 which is journalled to an extension 22a of the control arm 22. The shaft 48 drives an idler wheel 49 which is rotationally attached to a spring loaded member 22b carried by the control arm 22. The idler wheel 49 drives an annular shaped friction disc 50 which surrounds the shaft 46a of the takeup spindle 46. Attached to the disc 50 is a generally cylindrical ratchet wheel 51 best shown in FIG. 7. One of the inclined teeth 51a of the ratchet wheel 51 is engaged by a flexible pawl 52 which projects from an extension 22c of the control arm 22. The teeth 51a are inclined in an appropriate direction so that rotation of the spindle 46 is permitted while the capstan 30 is being driven, but such spindle rotation is prevented when the capstan 29 is driven.

Affixed to the spindle shaft 46a is a disc 53 which seats freely within the cylindrical ratchet wheel 51. An annular felt pad (not shown) may be situated between the upper surface of the disc 53 and the bottom surface of the friction disc 50. A bias spring 54 surrounds a portion of the spindle shaft 46a between a shoulder at the bottom of the spindle 46 and the top of the friction disc 50. This spring 54 biases the friction disc 50 into driving contact with the pad and the disc 53.

When the motor 26 is rotating counterclockwise (as seen in FIG. 2), the flywheel 28 will rotate clockwise and the capstan 30 will be driven. The pulley 35 will also rotate clockwise, as viewed from below, so that the shaft 48 will rotate clockwise, the idler wheel will rotate counterclockwise and the friction disc 50 will rotate clockwise, all viewed from below. The friction disc 50 will urge the disc 53 and the shaft 46a to rotate clockwise, as viewed from below. As seen in FIG. 7, such rotation will be permitted, since the pawl 52 is sufficiently flexible so as to slide up and over the inclined portion of each of the ratchet teeth 51a. Rotation of the friction disc 50 thus will impart clockwise motion to the takeup spindle 46 (as viewed from below), exactly as required to wind the incoming message tape onto the takeup side of the cassette 17.

During outgoing announcement transmission the motor 26 rotates in the clockwise direction (as viewed in FIG. 2). Accordingly, the pulley 35 and shaft 48 will rotate counterclockwise and the idler wheel 49 will rotate clockwise, thereby urging the friction disc 50 and ratchet wheel 51 to rotate counterclockwise as viewed from below. However, such rotation of the disc 50 is prevented by the pawl 52, thus the takeup spindle 46 will remain stopped. This is exactly as required while the outgoing announcement tape cassette 16 is being driven.

To rewind the incoming message tape cassette 17, the control arm 22 is moved to the position shown in FIG. 8. This disengages the drive transfer mechanism 36 from the takeup spindle 46, and enables direct drive of the supply spindle 55. To this end, when the control arm 22 is pivoted to the rewind position, the projections 22a and 22b carry the shaft 48 and the idler wheel 49 away from engagement with the friction wheel 50. At the same time, a gear 56 on the shaft 48 is brought into mesh with a gear 57 attached to the shaft 55a of the supply spindle 55. This arrangement provides direct drive from the motor 26 via the belt 34, the pulley 35, and the gears 56 and 57 to the takeup spindle 55.

The motor 26 is rotated counterclockwise (as viewed from below) so as to rotate the pulley 35 clockwise and the spindle 55 counterclockwise as viewed from below. This is the appropriate direction for rewinding the tape in the cassette 17. With such rotation, the capstan 29 of the outgoing cassette will be stationary. The capstan 30 of the incoming tape cassette will be driven. However, since the associated pinch roller 58, which is mounted on the control arm 22, is withdrawn away from operative contact with the tape capstan 30, rotation of the capstan 30 will not impede the rewind operation. Also, placement of the control arm 22 in the rewind position (FIG. 8) will withdraw the pawl 52 out of engagement with the ratchet wheel 51. Thus the spindle 46 will be free to turn as the tape is rewound in the cassette 17.

Figure 9A:
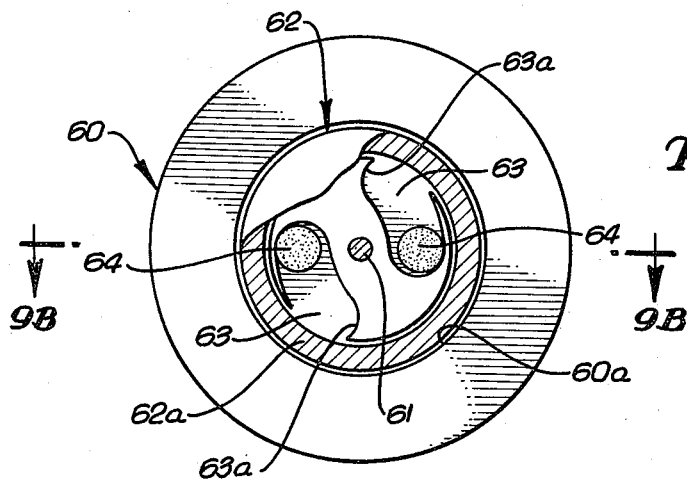
FIGS. 9A and 9B are respectively bottom and transverse sectional views of an alternative one-way clutch design.
Figure 9B:
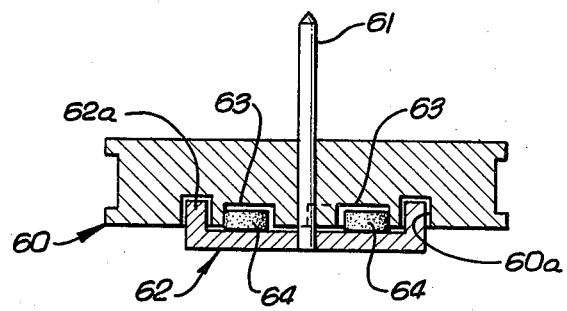

Alternate forms of one-way clutches may be used in place of the coil spring embodiment of the assemblies 31 and 32. For example, in the alternative embodiment of FIGS. 9A and 9B the flywheel 60 slips loosely on the capstan shaft 61. A cup-like member 62 is affixed to the bottom of the shaft 61 and has a cylindrical skirt 62a which fits freely into a circular recess 60a in the bottom surface of the flywheel 60. Extending laterally inward from the recess 60a is a pair of spiral grooves 63 each containing a ball or puck-like rubber disc 64.

When the flywheel 60 is rotated in one direction (clockwise in the bottom view of FIG. 9), centrifugal force causes the discs 64 to move radially outward. The discs 64 then are caught between a surface 63a of the groove 63 and the inner surface of the skirt 62a. As a result, rotation of the flywheel 60 is imparted to the spindle shaft 61. When the flywheel 60 is rotated in the other direction, the discs 64 are pulled inward and seat within the grooves 63 in the positions shown in FIG. 9A. As a result the capstan shaft 61 and member 62 freewheel, and rotation of the flywheel 60 is not imparted to the capstan shaft.

The motor 26 may comprise a dc motor the direction of rotation of which is established by the polarity of the voltage applied thereto. The control circuit for the motor thus may comprise a conventional polarity reversing circuit which is set to a first polarity in response to ring detection, and is thereafter is set to the opposite polarity in response to completion of transmission of the outgoing announcement. In that respect, the announcement tape loop in the cassette 16 may be provided with an electrically conductive segment. At the end of one revolution of the tape loop, when announcement transmission is completed, the conductive strip may short out a a pair of electrical contacts 69 (FIGS. 5 and 8) that are mounted on the control arm 21. Shorting of these contacts then provides a signal which may be used to reverse the polarity of the voltage supplied to the motor 26, thereby reversing its direction of rotation and transferring tape drive from the outgoing announcement cassette 16 to the incoming message cassette 17.

Figure 10:
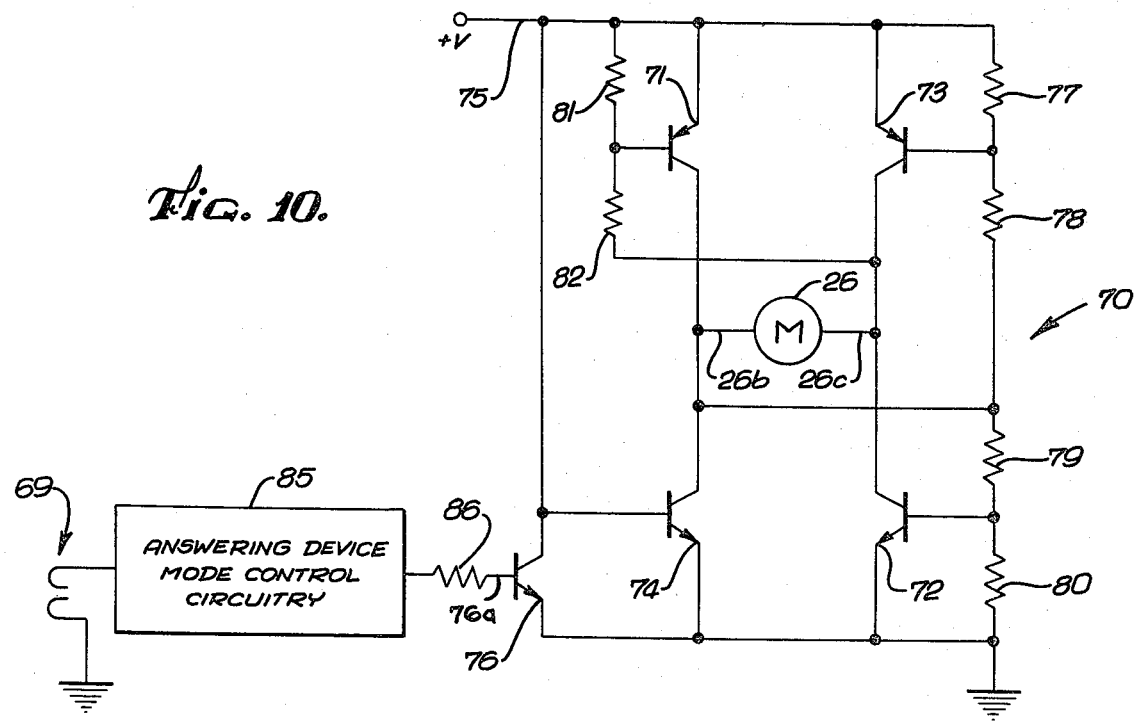
FIG. 10 is an electrical schematic diagram of a polarity reversing circuit useful for controlling the single motor of the drive assembly of FIG. 2.

An advantageous form of motor polarity reversing circuit 70 is shown in FIG. 10. The motor 26 is connected across two opposite nodes of a bridge circuit consisting of four transistors 71–74. When the transistors 71 and 72 are on and the transistors 73 and 74 are off, positive voltage +V is supplied via a line 75 to the motor terminal 26b and the terminal 26c is grounded. In this condition, the motor 26 rotates clockwise (as viewed from below in FIG. 2). When the transistors 73 and 74 are on and the transistors 71 and 72 are off, positive voltage is supplied to the motor terminal 26c and the terminal 26b is grounded. In this case, the motor 26 rotates counterclockwise.

A transistor 76 is used to switch the circuit 70 between these two conditions. When current is injected into the base of the transistor 76, its collector saturates to ground thereby bringing the base of the transistor 74 also to ground potential. This turns off the transistor 74, so that the motor terminal 26b is not clamped to ground. Current flows through the dual voltage dividers consisting of the resistors 77 through 80, thereby providing sufficient base voltage to the transistor 72 to turn it on. The motor terminal 26c is thus clamped to ground, as is the collector of the transistor 73. Current then flows through a voltage divider comprising the resistors 81 and 82. The resultant low voltage at the base of the PNP transistor 71 turns that transistor on, thereby effectively connecting the +V voltage from the line 75 to the motor terminal 26b.

Since the terminal 26b is now at +V potential, the junction of the resistors 78 and 79 is likewise at this potential, as is the base of the PNP transistor 73. This turns the transistor 73 off.

In this first state of the circuit 70, positive voltage is applied to the motor terminal 26b, and the motor turns clockwise so as to drive only the outgoing announcement tape cassette 16. The alternate second state of the circuit 70 is achieved when the terminal 76a is grounded. In that instance, positive voltage is applied to the terminal 26c and the motor turns counterclockwise to drive the incoming message tape cassette 17.

When the base 76a is grounded, the transistor 76 is off. As a result, +V voltage is supplied via a resistor 83 to the base of the resistor 74, turning that transistor on. This clamps the motor terminal 26b to ground, and also grounds the junction of the resistors 78 and 79. As a result, the voltage at the base of the PNP transistor 73 drops sufficiently to turn that transistor on, thereby supplying +V voltage to the motor terminal 26c. Since both ends of the voltage divider 81, 82 are at +V potential, the base of the transistor 71 is at a like potential, thereby turning this PNP transistor 71 off. Similarly, both ends of the voltage divider 79, 80 are grounded, thereby effectively grounding the base of the NPN transistor 72, turning it off. This is the second state of the circuit 70.

In the telephone answering device 15 the conventional mode control circuitry 85 is used appropriately to condition the circuit 70 to its first or second state. Thus upon ring detection, the circuitry 85 provides current via a resistor 86 to the base 76a of the transistor 76. This causes the circuit 70 to assume the first state in which the motor 26 rotates clockwise and drives the outgoing announcement tape cassette 16. Upon completion of outgoing announcement transmission, when the conductive strip on the message tape loop shorts the pair of contacts 69, the output of the circuitry 85 is grounded. The circuit 70 now assumes the second state in which the motor 26 turns counterclockwise and drives the incoming message tape cassette 17. When the control arm 21 is set to the "playback" condition, the circuitry 85 is conditioned to ground the resistor 86, thereby again setting the circuit 70 to the second state so as to drive the incoming message tape cassette, as required for playback.

I claim:

1. In a telephone answering device in which the outgoing announcement is contained on a first magnetic tape and in which incoming messages are recorded on a second magnetic tape, the improvement comprising:
   a single motor having a reversible direction of rotation,
   coupling means, interconnected to said single motor, for respectively driving only one or the other of said first and second magnetic tapes upon corresponding rotation of said single motor in one or the opposite direction,
   first circuit means for energizing said motor to rotate in a first direction upon initial answering of a call by said device, and
   second means for causing the direction of rotation of said motor to be reversed upon completion of announcement transmission from said first magnetic tape, and
   wherein said coupling means comprises a pair of one-way clutches associated respectively with said first and second magnetic tapes.

2. In a telephone answering device of the type in which the outgoing announcement is contained on a first magnetic tape cassette and in which incoming messages are recorded on a second magnetic tape cassette, said telephone answering device having a tape drive capstan for each of said first and second cassettes, an improved cassette drive system comprising:
   a single drive motor having a reversible direction of rotation,
   a first flywheel engaging the shaft of the announcement cassette tape drive capstan and connected thereto by a first one-way clutch,
   a second flywheel engaging the shaft of the incoming message cassette tape drive capstan and connected thereto by a second one-way clutch, and
   drive belt means coupling said drive motor to said first and second flywheels so as to impart rotational motion thereto in respective opposite directions while said motor is rotating in one direction,
   said clutches being arranged so that only said first clutch is engaged when said motor rotates in a first direction and only said second clutch is engaged when said motor rotates in the opposite direction, together with
   first circuit means for energizing said motor to rotate in a said first direction upon initial answering of a call by said device, so that rotational motion will be imparted only to said announcement cassette tape drive capstan, and
   second means for causing the direction of rotation of said motor to be reversed upon completion of announcement transmission from said first magnetic tape, so that rotational motion will be imparted only to said incoming message cassette tape drive capstan.

3. Apparatus according to claim 2 wherein said telephone answering device has a supply spindle and a takeup spindle for said second magnetic tape cassette, and wherein said cassette drive system further comprises:
   a spindle drive assembly including a pulley engaged by said belt,
   an annular friction disc surrounding the shaft of said takeup spindle and driven by said spindle drive assembly, said friction disc having a ratchet wheel attached thereto,
   a drive disc attached to said takeup spindle shaft and abutting said friction disc so as to be driven thereby, and
   a flexible pawl engaging the teeth of said ratchet wheel to prevent rotation of said friction disc and takeup spindle when said motor rotates in said first direction,
   said pawl being sufficiently flexible so that when said motor rotates in the opposite direction, the resultant opposite rotation of said friction disc will be imparted via said drive disc to said takeup spindle, said pawl slipping over the teeth of said ratchet wheel during such rotation.

4. Apparatus according to claim 3 wherein said telephone answering device includes a mechanical member which is moved with respect to said second magnetic tape cassette when said device is conditioned to rewind that cassette,
   said flexible pawl being carried by said member and being disengaged from said ratchet wheel when said member is moved to condition rewind.

5. A device according to claim 3 wherein said telephone answering device includes a control arm which carries said spindle drive assembly, said control arm being pivotable with respect to said incoming message tape cassette between a "forward" position in which said spindle drive assembly can drive said takeup spindle and a "rewind" position in which said spindle drive assembly can drive to the rewind spindle of said second magnetic tape cassette,
   said flexible pawl being carried by said control arm so as to engage said ratchet wheel when control arm is in said "forward" position and so as to be disengaged from said ratchet wheel when said control arm is in said "rewind" position.

6. Apparatus according to claim 2 wherein each of said one-way clutches comprises:
   a first coil spring having one end affixed to the associated flywheel, and being coiled around said capstan shaft so as to tighten thereabout as said flywheel is rotated in one direction.

7. Apparatus according to claim 6 wherein each of said one-way clutches further comprises:
   a second coil spring having one end affixed to the chassis of said telephone answering device, and being coiled around said capstan shaft so as to tighten thereabout as said capstan shaft rotates in the direction opposite to said one direction.

8. In a telephone answering device in which two mechanical assemblies are to be separately operated at different times, said two assemblies comprising respectively an announcement tape drive mechanism and an incoming message recording tape drive mechanism, the improvement comprising:
   a single motor having a reversible direction of rotation,
   interconnection means for interconnecting said single motor to both of said mechanical assemblies via respective one-way clutches of opposite sense, whereby rotation of said motor in one direction will be imparted only to one of said assemblies and rotation of said motor in the other direction will be imparted only to the other of said assemblies, and wherein each one-way clutch selectively couples a member rotationally driven by said single motor to a respective shaft that is journalled to said member, said respective shaft imparting rotation to a respective one of said assemblies, comprising:

a cup attached to the end of said shaft, said cup having a cylindrical skirt, said member having, in the surface facing said cup, a circular groove that freely receives said skirt, and at least one spiral groove which opens into said circular groove, and a coupling element movably situated within each spiral groove, said element being thrust outwardly and wedging between a surface of said spiral groove and said skirt when said member is driven in one direction, thereby coupling rotational motion in said one direction to said shaft, said coupling element moving to the inner end of said spiral groove when said member is rotated in the opposite direction whereby such opposite rotation is not coupled to said shaft.

9. In a telephone answering device in which two mechanical assemblies are to be separately operated at different times, said two assemblies comprising respectively an announcement tape drive mechanism and an incoming message recording tape drive mechanism, the improvement comprising:

a single motor having a reversible direction of rotation, interconnection means for interconnecting said single motor to both of said mechanical assemblies via respective one-way clutches of opposite sense, whereby rotation of said motor in one direction will be imparted only to one of said assemblies and rotation of said motor in the other direction will be imparted only to the other of said assemblies, and wherein the direction of rotation of said single motor is controlled by a polarity reversing circuit comprising:

a transistor bridge in which opposite legs have transistors of complementary type, a voltage source of fixed polarity being applied across first and second opposite nodes of said bridge, said circuit providing a voltage output of reversible polarity across the other third and fourth opposite nodes of said bridge, a fifth transistor connected selectively to provide to one transistor in said bridge either a first bias which turns on said one transistor or a second bias which turns off said one transistor, and interconnection means for cooperatively causing pairs of transistors in opposite legs of said bridge to conduct or not conduct in response to turn-on or turn-off of said one transistor, said interconnection means comprising:

a voltage divider consisting of first through fourth resistors connected in series across said voltage source, the junctions between said first and second resistors and between said third and fourth resistors being connected respectively to the control elements of the pair of transistors respectively connecting said first and second nodes of said bridge to said fourth node, the junction between said second and third resistors being connected to said bridge third node, said one transistor being connected between said bridge second and third nodes, and a voltage divider consisting of fifth and sixth resistors connected in series between said first and fourth nodes of said bridge, the junction between said fifth and sixth resistors being connected to the control element of the transistor connected between said bridge first and third nodes.

* * * * *